United States Patent
Channell

(10) Patent No.: US 10,704,495 B2
(45) Date of Patent: Jul. 7, 2020

(54) PRE-EXIT PIVOT DOOR THRUST REVERSER

(71) Applicant: ROHR, INC., Chula Vista, CA (US)

(72) Inventor: Martin Channell, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 246 days.

(21) Appl. No.: 15/822,425

(22) Filed: Nov. 27, 2017

(65) Prior Publication Data
US 2019/0162135 A1    May 30, 2019

(51) Int. Cl.
*F02K 1/60* (2006.01)
*F02K 1/62* (2006.01)

(52) U.S. Cl.
CPC .............. *F02K 1/625* (2013.01); *F02K 1/60* (2013.01); *F05D 2250/30* (2013.01)

(58) Field of Classification Search
CPC ... F02K 1/62; F02K 1/625; F02K 1/70; F02K 1/72; F02K 1/763; F02K 1/60; F02K 1/605
See application file for complete search history.

(56) References Cited

U.S. PATENT DOCUMENTS

| | | | |
|---|---|---|---|
| 3,764,096 A | 10/1973 | Wright | |
| 5,779,192 A * | 7/1998 | Metezeau | F02K 1/60 239/265.29 |
| 6,079,201 A * | 6/2000 | Jean | F02K 1/70 239/265.29 |
| 6,845,946 B2 * | 1/2005 | Lair | F02K 1/70 244/110 B |
| 8,051,639 B2 | 11/2011 | Lair | |
| 8,172,175 B2 | 5/2012 | Lair | |
| 8,434,715 B2 | 5/2013 | Lair | |
| 2002/0184874 A1 * | 12/2002 | Modglin | F02K 1/60 60/226.1 |
| 2009/0126339 A1 * | 5/2009 | Lair | F02K 1/60 60/226.2 |
| 2011/0101159 A1 * | 5/2011 | Lair | F02K 1/60 244/110 B |
| 2013/0056554 A1 * | 3/2013 | Guillois | B64D 33/04 239/265.19 |

FOREIGN PATENT DOCUMENTS

| | | |
|---|---|---|
| DE | 1100385 | 2/1961 |
| EP | 2060765 | 5/2009 |
| WO | 2014109785 | 7/2014 |

OTHER PUBLICATIONS

European Patent Office, European Search Report dated Apr. 11, 2019 in Application No. 18208691.8.

* cited by examiner

*Primary Examiner* — Andrew H Nguyen
(74) *Attorney, Agent, or Firm* — Snell & Wilmer, L.L.P.

(57) ABSTRACT

A pre-exit thrust reverser includes an upper reverser door pivotally mounted to a frame and having an upper trailing edge, a lower reverser door pivotally mounted to the frame and having a lower trailing edge and an exhaust duct fixedly mounted to the frame. The upper trailing edge is configured to extend aft of the lower trailing edge when the thrust reverser assumes a deployed state.

18 Claims, 3 Drawing Sheets

PRE-EXIT PIVOT DOOR THRUST REVERSER

FIELD

The present disclosure relates generally to aircraft gas turbine engines and, more particularly, to pre-exit pivot door thrust reversers used with turbofan gas turbine engines.

BACKGROUND

Turbofan gas turbine engines are known to include a fan section that produces a bypass airflow for providing the majority of engine propulsion and a core engine section in which a core airflow is compressed, mixed with fuel, combusted and expanded through a turbine to drive the fan section. In a mixed flow turbofan engine, the bypass airflow is ducted between a surrounding nacelle and an outer casing of the core engine section and mixed with an exhaust stream from the core engine section prior to discharge from the engine in a combined or mixed exhaust stream. The surrounding nacelle may include thrust reversers capable of redirecting the bypass airflow from the rearward direction to, at least partially, a forward direction thus producing a rearward thrust. The rearward thrust may serve to decelerate the forward motion of an aircraft and thereby assist braking the aircraft upon landing.

SUMMARY

A pre-exit thrust reverser is disclosed. In various embodiments, the thrust reverser includes an upper reverser door pivotally mounted to a frame and having an upper trailing edge, a lower reverser door pivotally mounted to the frame and having a lower trailing edge and an exhaust duct fixedly mounted to the frame. The upper trailing edge is configured to extend aft of the lower trailing edge when the thrust reverser assumes a deployed state.

In various embodiments, the thrust reverser includes an upper pivot assembly pivotally connecting the upper reverser door to the frame and a lower pivot assembly pivotally connecting the lower reverser door to the frame. In various embodiments, the upper pivot assembly has a center of rotation positioned aft of a center of rotation of the lower pivot assembly.

In various embodiments, the frame includes a port side beam and a starboard side beam and the upper pivot assembly includes an upper port pivot assembly mounted to the port side beam and an upper starboard pivot assembly mounted to the starboard side beam. In various embodiments, the lower pivot assembly includes a lower port pivot assembly mounted to the port side beam and a lower starboard pivot assembly mounted to the starboard side beam.

The exhaust duct is configured to mate with the upper reverser door and the lower reverser door. In various embodiments, the upper reverser door has an upper door length and the exhaust duct has an upper duct length, the lower reverser door has a lower door length and the exhaust duct has a lower duct length, and the sum of the upper door length and the upper duct length is about equal to the sum of the lower door length and the lower duct length. In various embodiments, the upper reverser door has an upper door length and the lower reverser door has a lower door length and the upper door length is greater than the lower door length. In various embodiments, the exhaust duct has an aft end, and a radial plane extending through the aft end is substantially perpendicular to a central axis extending through the thrust reverser.

In various embodiments, the exhaust duct has an inner surface substantially cylindrical in shape and the upper reverser door and the lower reverser door have inner surfaces configured to mate with the interior surface of the exhaust duct to provide a substantially cylindrical exhaust tube. In various embodiments, the thrust reverser includes an exhaust cone having an inner surface substantially cylindrical in shape and the inner surfaces of the upper reverser door and the lower reverser door are configured to mate with the inner surface of the exhaust cone to provide a substantially cylindrical exhaust tube along a length of the thrust reverser.

In various embodiments, the thrust reverser includes an actuator configured to open and close the upper reverser door and the lower reverser door. In various embodiments, the thrust reverser includes an upper actuator configured to open and close the upper reverser door and a lower actuator configured to open and close the lower reverser door.

In various embodiments, a pre-exit thrust reverser for a turbofan engine is disclosed. The thrust reverser includes an upper reverser door pivotally mounted to a frame and a lower reverser door pivotally mounted to the frame. The upper door has an upper door length and the lower door has a lower door length. An exhaust duct is fixedly mounted to the frame. In various embodiments, the upper door length is greater than the lower door length and the upper trailing edge is configured to extend aft of the lower trailing edge when the thrust reverser assumes a deployed state.

In various embodiments, the exhaust duct has an inner surface substantially cylindrical in shape and the upper reverser door and the lower reverser door have inner surfaces configured to mate with the inner surface of the exhaust duct to provide a substantially cylindrical exhaust tube. In various embodiments, the thrust reverser includes an exhaust cone having an inner surface substantially cylindrical in shape and the inner surfaces of the upper reverser door and the lower reverser door are configured to mate with the inner surface of the exhaust cone to provide a substantially cylindrical exhaust tube along a length of the thrust reverser.

In various embodiments, the thrust reverser includes an upper pivot assembly pivotally connecting the upper reverser door to the frame and a lower pivot assembly pivotally connecting the lower reverser door to the frame. In various embodiments, the upper pivot assembly has a center of rotation positioned aft of a center of rotation of the lower pivot assembly.

In various embodiments, a gas turbine engine is disclosed. The gas turbine engine includes, a core engine, a nacelle surrounding the core engine, a fan operably connected to the core engine and configured to drive air along a flow path in a bypass duct between the nacelle and an outer casing of the core engine, a mixing section where exhaust from the core engine is mixed with the air in the flow path as the air exits the flow path and a thrust reverser downstream of the mixing section. In various embodiments, the thrust reverser comprises an upper reverser door pivotally mounted to a frame and having an upper trailing edge, a lower reverser door pivotally mounted to the frame having a lower trailing edge and an exhaust duct fixedly mounted to the frame. In various embodiments, the upper trailing edge is configured to extend aft of the lower trailing edge when the thrust reverser assumes a deployed state.

In various embodiments, the gas turbine engine includes an upper pivot assembly pivotally connecting the upper reverser door to the frame and a lower pivot assembly pivotally connecting the lower reverser door to the frame, and the upper pivot assembly has a center of rotation positioned aft of a center of rotation of the lower pivot assembly. In various embodiments, the upper reverser door has an upper door length and the lower reverser door has a lower door length, where the upper door length is greater than the lower door length.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component, though not necessarily of the same axial position. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" or "proximate" refer to a direction inward, or generally, towards the reference component.

Figure 1:
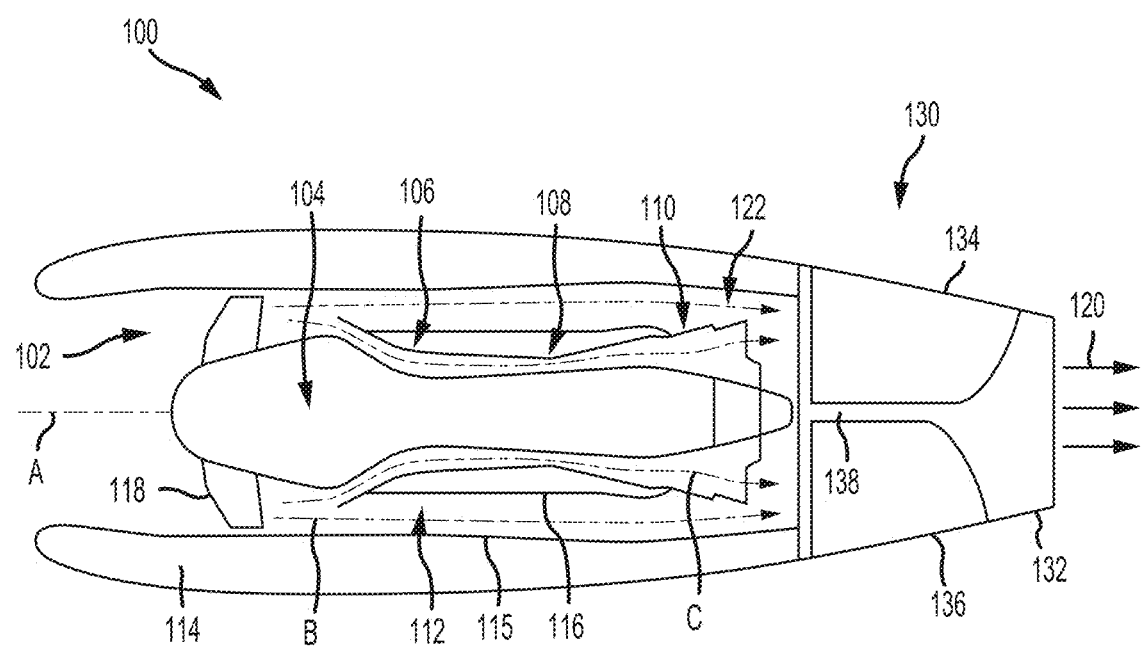
FIG. 1 is a schematic view of a gas turbine engine, in accordance with various embodiments.

Referring now to the drawings, FIG. 1 schematically illustrates a gas turbine engine 100 of the turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed or retracted position, as illustrated in FIG. 1. The thrust reverser 130 further includes an upper reverser door 134, a lower reverser door 136 and a pair of opposing side beams 138, which house actuator componentry and connecting members used to open and close the upper reverser door 134 and the lower reverser door 136. In various embodiments, as discussed below, the reverser doors may be opened and closed by actuators positioned at or near upper or lower centerline positions of the thrust reverser 130. As also discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 provides the reverse thrust used to decelerate the aircraft upon landing.

Figure 2:
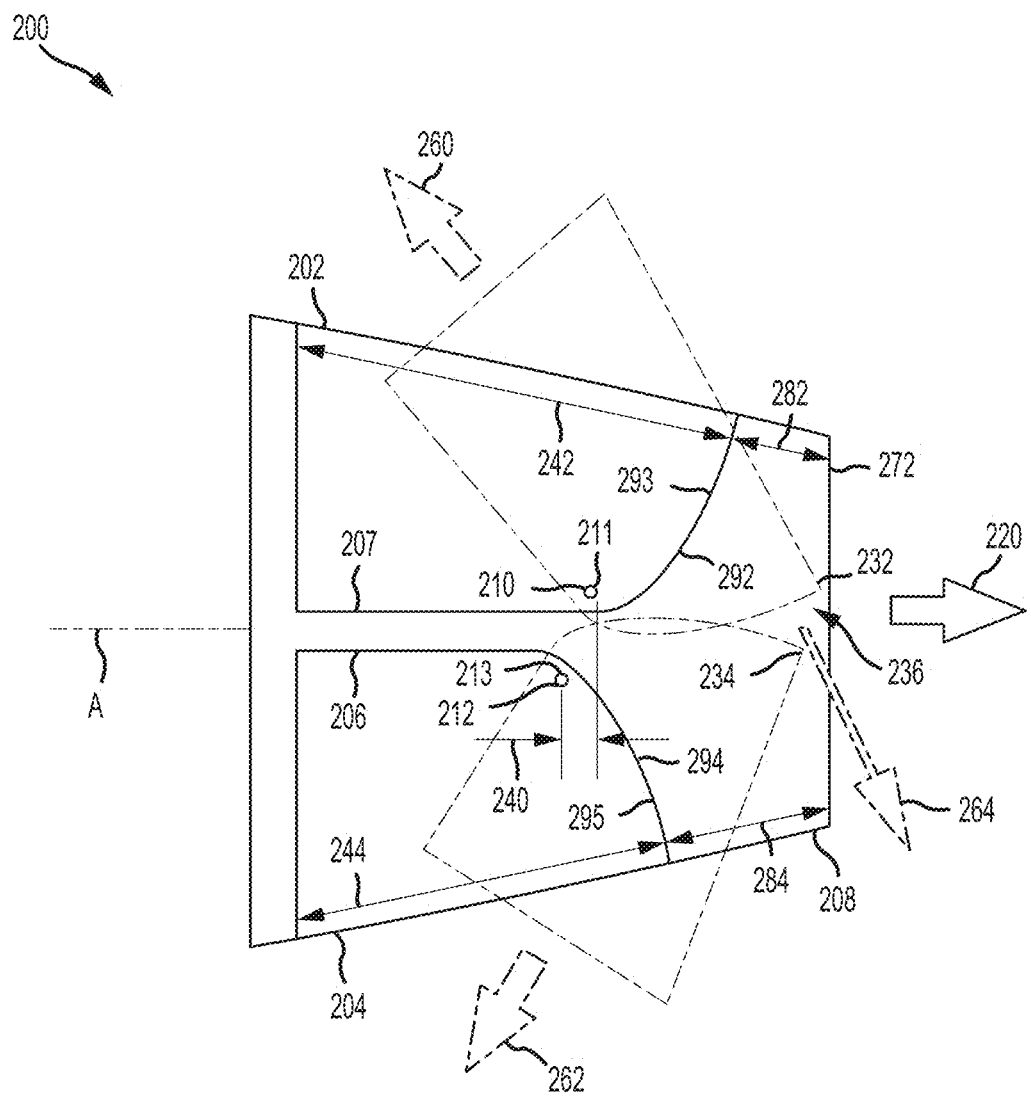
FIG. 2 is a side view of a thrust reverser according to various embodiments.

Referring now to FIG. 2, a side view of a thrust reverser 200 according to various embodiments is illustrated in the closed or retracted position (solid lines) and in the open or deployed position (dotted lines). The thrust reverser 200 includes an upper reverser door 202, a lower reverser door 204, a pair of opposing side beams 206 (only one is shown) and an exhaust duct 208. In various embodiments, the pair of opposing side beams 206 comprises a port side beam 207 and a starboard side beam (hidden). As described in more detail below, the pair of opposing side beams 206 provides a frame or structural support for mounting related components and operating the thrust reverser 200 between deployed and retracted positions. For example, an upper pivot assembly 210 is mounted to a respective one of the opposing side beams 206 and facilitates rotation of the upper reverser door 202 between open and closed states within the thrust reverser 200. Similarly, a lower pivot assembly 212 is mounted to a respective one of the opposing side beams 206 and facilitates rotation of the lower reverser door 204 between open and closed states within the thrust reverser 200. In various embodiments, an upper port pivot assembly 211 is mounted to an upper surface of the port side beam 207 and a lower port pivot assembly 213 is mounted to a lower surface of the port side beam 207. In various embodiments, an upper starboard pivot assembly (hidden) is mounted to an upper surface of the starboard side beam (hidden) and a lower starboard pivot assembly (hidden) is mounted to a lower surface of the starboard side beam (hidden). In various embodiments, the starboard side pivot assembly and side beam configuration described above is symmetrical with the port side pivot assembly and side beam configuration described above.

When the thrust reverser 200 assumes the closed or retracted position, e.g., during flight, the upper reverser door 202 and the lower reverser door 204 are rotated to their closed positions (solid lines). The outer surfaces of the upper reverser door 202 and the lower reverser door 204 blend with the outer surface of the nacelle, forming a smooth aerodynamic shape to the nacelle of the gas turbine engine. At the same time, a mixed gas stream 220 exits the exhaust duct 208 generally unaffected by the thrust reverser 200 or its componentry, as the inner surfaces of the upper reverser door 202 and the lower reverser door 204 are blended with the interior surface of the exhaust duct 208 to provide a smooth walled, generally annular exhaust flow path from downstream of the core engine exhaust to the downstream exit or aft end 272 of the exhaust duct 208. While in the retracted position, the entire mixed gas stream 220 flows out the exhaust duct, providing forward thrust necessary to fly the aircraft. When the thrust reverser 200 assumes the open or deployed position, e.g., upon landing, the upper reverser door 202 and the lower reverser door 204 are rotated to their open positions (dotted lines). The mixed gas stream 220 is diverted from the exit of the exhaust duct 208 to form an upward stream 260, following an inner surface of the upper reverser door 202 and a downward stream 262, following an inner surface of the lower reverser door 204. Both the upward stream 260 and the downward stream 262 have forward vector components of thrust, which provide the reverse thrust on the aircraft.

Still referring to FIG. 2, when the thrust reverser 200 assumes the deployed state, an upper trailing edge 232 of the upper reverser door 202 extends aft of a lower trailing edge 234 of the lower reverser door 204. The resulting configuration provides a gap 236 between the upper trailing edge 232 and the lower trailing edge 234 through which a leakage stream 264 flows downward and aft through the downstream exit of the exhaust duct 208. In various embodiments, the gap 236 may be created by offsetting the centers of rotation of the upper pivot assembly 210 and the lower pivot assembly 212 by an offset distance 240 along a central axis A. The gap 236 may also be created by incorporating an asymmetry into the length of the upper reverser door 202 relative to the lower reverser door 204. In various embodiments, the upper reverser door 202 has an upper door length 242 and the lower reverser door 204 has a lower door length 244, and the upper door length 242 is greater than the lower door length 244. In various embodiments, the gap 236 is created by both offsetting the centers of rotation of the upper pivot assembly 210 and the lower pivot assembly 212 by an offset distance 240 along a central axis A and by incorporating an asymmetry into the length of the upper reverser door 202 relative to the lower reverser door 204.

In various embodiments, the exhaust duct 208 has a shape that corresponds with the shapes and positioning of the upper reverser door 202 and the lower reverser door 204. In various embodiments, the exhaust duct 208 has an upper duct length 282 and a lower duct length 284. The upper duct length 282 is sized to correspond with the upper door length 242 such that a radial plane extending through the exit or aft end 272 of the exhaust duct 208 is substantially perpendicular to the central axis A. Similarly, the lower duct length 284 is sized to correspond with the lower door length 244 such that the radial plane extending through the exit or aft end 272 of the exhaust duct 208 is substantially perpendicular to the central axis A. Thus, if the upper door length 242 has a value greater than the lower door length 244, as illustrated in FIG. 2, the corresponding upper duct length 282 will have a value less than the lower duct length 284. In various embodiments, the sum of the lengths of the upper door length 242 and the upper duct length 282 is about equal to the sum of the lengths of the lower door length 244 and the lower duct length 284. In various embodiments, the sum of the lengths of the upper door length 242 and the upper duct length 282 is equal to the sum of the lengths of the lower door length 244 and the lower duct length 284. In various embodiments, the exhaust duct 208 may include an upper side contour 292 and a lower side contour 294. The upper side contour 292 has a shape that corresponds with the shape of an upper aft contour 293 of the upper reverser door 202. Similarly, the lower side contour 294 has a shape that corresponds with the shape of a lower aft contour 295 of the lower reverser door 204.

Figure 3:
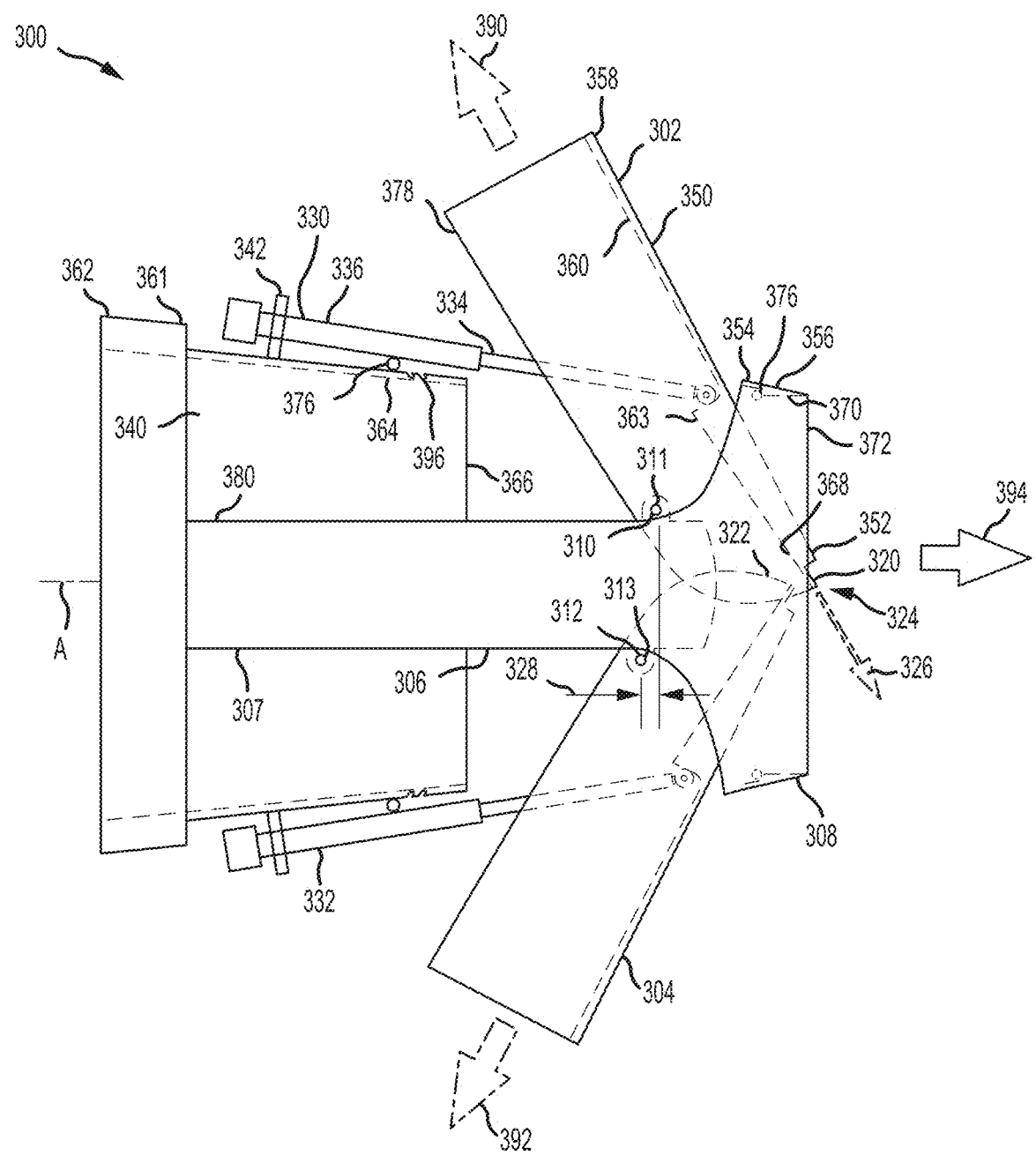
FIG. 3 is a side view of a thrust reverser according to various embodiments.

Referring now to FIG. 3, a side view of a thrust reverser 300 according to various embodiments is illustrated in the open or deployed position. The thrust reverser 300 includes an upper reverser door 302, a lower reverser door 304, a pair of opposing side beams 306 (only one is shown) and an exhaust duct 308. In various embodiments, the pair of opposing side beams 306 comprises a port side beam 307 and a starboard side beam (hidden). In various embodiments, the pair of opposing side beams 306 provides a frame or structural support for operating the thrust reverser 300 between deployed and retracted positions. An upper pivot assembly 310 is mounted to a respective one of the opposing side beams 306 and facilitates rotation of the upper reverser door 302 between open and closed states within the thrust reverser 300. Similarly, a lower pivot assembly 312 is mounted to a respective one of the opposing side beams 306 and facilitates rotation of the lower reverser door 304 between open and closed states within the thrust reverser 300. In various embodiments, an upper port pivot assembly 311 is mounted to an upper surface of the port side beam 307 and a lower port pivot assembly 313 is mounted to a lower surface of the port side beam 307. In various embodiments, an upper starboard pivot assembly (hidden) is mounted to an upper surface of the starboard side beam (hidden) and a lower starboard pivot assembly (hidden) is mounted to a lower surface of the starboard side beam (hidden). In various embodiments, the starboard side pivot assembly and side beam configuration described above is symmetrical with the port side pivot assembly and side beam configuration described above. When the thrust reverser 300 assumes the deployed state, an upper trailing edge 320 of the upper reverser door 302 extends aft of a lower trailing edge 322 of the lower reverser door 304. The resulting configuration provides a gap 324 between the upper trailing edge 320 and the lower trailing edge 322. Similar to the discussion above with respect to FIG. 2, the gap 324 provides an exit through which a leakage stream 326 flows downward and aft through the downstream exit of the exhaust duct 308. The leakage stream 326 accompanies an upward stream 390 and a downward stream 392 similar to that described above with reference to FIG. 2. While in the retracted state, a mixed gas stream 394 exits the exhaust duct 308. In various embodiments, the gap 324 may be created by offsetting the centers of rotation of the upper pivot assembly 310 and the lower pivot assembly 312 by an offset distance 328 along a central axis A.

Still referring to FIG. 3, an upper actuator 330 is configured to open and close the upper reverser door 302. A lower actuator 332 is similarly configured to open and close the lower reverser door 304. The upper actuator 330 may include an actuator rod 334 and an actuator base 336 within which the actuator rod 334 retracts or extends. The upper actuator 330 may be hydraulically, electrically or otherwise mechanically powered and configured for extending or retracting the actuator rod 334 for pivoting the upper reverser door 302 between open and closed positions. The actuator base 336 of the upper actuator 330 may be secured to an external surface of an exhaust cone 340 using a mount 342. In various embodiments, the mount 342 is configured to facilitate rotation of the actuator base 336 in a vertical direction about the mount 342 when opening or closing the upper reverser door 302. The actuator rod 334 is pivotally secured to an inner surface of the upper reverser door 302. Extension or retraction of the actuator rod 334 with respect to the actuator base 336 open or closes, respectively, the upper reverser door 302. In various embodiments, the ends of the upper actuator 330 may be reversed, such that the actuator rod 334 is mounted to the exhaust cone 340 and the actuator base 336 is mounted to the upper reverser door 302. The lower actuator 332 is configured and operates in a manner similar to the upper actuator 330.

Still referring to FIG. 3, the upper reverser door 302 has an outer surface 350. The outer surface 350 has an aft portion 352 configured to mate with an exterior surface 354 of an upper duct portion 356 of the exhaust duct 308 and a fore portion 358 configured to mate with an exterior surface 361 of an upper base portion 362 of the exhaust cone 340. The outer surface 350 of the upper reverser door 302 is thus configured to mate closely with corresponding outer surface sections of the exhaust cone 340 and the exhaust duct 308 in order to provide a smooth aerodynamic outer surface for the exterior ambient air flow when the thrust reverser 300 assumes the retracted or closed position. The upper reverser door 302 also has an inner surface 360. The inner surface 360 has a first portion 363 configured to mate with an inner surface 364 of an aft end 366 of the exhaust cone 340. The inner surface 360 has a second portion 368 configured to mate with an inner surface 370 of the exhaust duct 308. The inner surface 360 of the upper reverser door 302 is thus configured to mate closely with corresponding inner surface sections of the exhaust cone 340 and the exhaust duct 308 in order to provide a smooth aerodynamic inner surface for the internal exhaust flow when the thrust reverser 300 assumes the retracted or closed position. In various embodiments, the smooth aerodynamic inner surface is substantially cylindrical, extending from the exhaust cone 340 through the exhaust duct 308. The upper reverser door 302 also has a side surface 378 (on both port and starboard sides) that extends from the fore end to the aft end of the opposing side beams 306 and is configured to mate with an upper exterior surface 380 of the opposing side beams 306. In various embodiments, a seal 376 extends from just fore of a cascade structure 396 downward and circumferentially between the upper reverser door 302 and the exhaust cone 340, aft between the upper reverser door 302 and the opposing side beams 308 and then upward and circumferentially between the upper reverser door 302 and the exhaust duct 308. The lower reverser door 304 is configured to provide aerodynamically smooth inner and outer surfaces in a fashion similar to that described above with reference to the upper reverser door 302. The cascade structure 396 may be used to provide additional venting of the mixed gas stream 394 while the thrust reverser 300 assumes a deployed state, In accordance with various embodiments, the above description provides a pre-exit thrust reverser having aerodynamically beneficial surfaces for flow of ambient air over an outer nacelle surface and flow of a mixed exhaust stream through a substantially cylindrical tube bounded by an inner surface. According to various embodiments, the exhaust duct comprises a portion of the inner surface of the tube and maintains a constant shape whether the thrust reverser assumes a retracted or deployed state. Stated otherwise, the exhaust duct described above remains an integral unit, obviating a need to ensure close tolerances between mating reverser doors used with non-pre-exit thrust reversers that, when retracted, comprise the exhaust duct. The features above described throughout this disclosure may be combined or incorporated separately to form pre-exit thrust reverses in accordance with various embodiments and the principles above described.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A pre-exit thrust reverser, comprising:
an upper reverser door pivotally mounted to a frame on an upper side of a central axis extending through the pre-exit thrust reverser and having an upper trailing edge;
a lower reverser door pivotally mounted to the frame on a lower side of the central axis and having a lower trailing edge; and
an exhaust duct fixedly mounted to the frame,
wherein the upper trailing edge is configured to extend aft of the lower trailing edge when the pre-exit thrust reverser assumes a deployed state and
wherein the upper reverser door has an upper door length and the lower reverser door has a lower door length, the upper door length being greater than the lower door length.

2. The pre-exit thrust reverser of claim 1, further comprising an upper pivot assembly pivotally connecting the upper reverser door to the frame and a lower pivot assembly pivotally connecting the lower reverser door to the frame.

3. The pre-exit thrust reverser of claim 2, wherein the upper pivot assembly has a center of rotation positioned aft of a center of rotation of the lower pivot assembly.

4. The pre-exit thrust reverser of claim 3, wherein the frame comprises a port side beam and a starboard side beam and wherein the upper pivot assembly comprises an upper port pivot assembly mounted to the port side beam and an upper starboard pivot assembly mounted to the starboard side beam.

5. The pre-exit thrust reverser of claim 4, wherein the lower pivot assembly comprises a lower port pivot assembly mounted to the port side beam and a lower starboard pivot assembly mounted to the starboard side beam.

6. The pre-exit thrust reverser of claim 5, wherein the exhaust duct is configured to mate with the upper reverser door and the lower reverser door.

7. The pre-exit thrust reverser of claim 6, wherein the exhaust duct has an upper duct length, wherein the exhaust duct has a lower duct length and wherein the sum of the upper door length and the upper duct length is equal to the sum of the lower door length and the lower duct length.

8. The pre-exit thrust reverser of claim 7, wherein the exhaust duct has an aft end and wherein a radial plane extending through the aft end is substantially perpendicular to the central axis extending through the pre-exit thrust reverser.

9. The pre-exit thrust reverser of claim 8, wherein the exhaust duct has an inner surface substantially cylindrical in shape and wherein the upper reverser door and the lower reverser door have inner surfaces configured to mate with the inner surface of the exhaust duct to provide a substantially cylindrical exhaust tube.

10. The pre-exit thrust reverser of claim 9, further comprising an exhaust cone having an inner surface substantially cylindrical in shape and wherein the inner surfaces of the upper reverser door and the lower reverser door are configured to mate with the inner surface of the exhaust cone.

11. The pre-exit thrust reverser of claim 10, further comprising an actuator configured to open and close the upper reverser door and the lower reverser door.

12. The pre-exit thrust reverser of claim 10, further comprising an upper actuator configured to open and close the upper reverser door and a lower actuator configured to open and close the lower reverser door.

13. A pre-exit thrust reverser for a turbofan engine, comprising:
an upper reverser door pivotally mounted to a frame on an upper side of a central axis extending through the pre-exit thrust reverser and a lower reverser door pivotally mounted to the frame on a lower side of the central axis, the upper reverser door having an upper door length and an upper trailing edge and the lower reverser door having a lower door length and a lower trailing edge; and
an exhaust duct fixedly mounted to the frame, wherein the upper door length is greater than the lower door length and wherein the upper trailing edge is configured to extend aft of the lower trailing edge when the pre-exit thrust reverser assumes a deployed state.

14. The pre-exit thrust reverser of claim 13, wherein the exhaust duct has an inner surface substantially cylindrical in shape and wherein the upper reverser door and the lower reverser door have inner surfaces configured to mate with the inner surface of the exhaust duct to provide a substantially cylindrical exhaust tube.

15. The pre-exit thrust reverser of claim 14, further comprising an exhaust cone having an inner surface substantially cylindrical in shape and wherein the inner surfaces of the upper reverser door and the lower reverser door are configured to mate with the inner surface of the exhaust cone.

16. The pre-exit thrust reverser of claim 15, further comprising an upper pivot assembly pivotally connecting the upper reverser door to the frame and a lower pivot assembly pivotally connecting the lower reverser door to the frame and wherein the upper pivot assembly has a center of rotation positioned aft of a center of rotation of the lower pivot assembly.

17. A gas turbine engine, comprising
a core engine;
a nacelle surrounding the core engine;
a fan operably connected to the core engine and configured to drive air along a flow path in a bypass duct between the nacelle and an outer casing of the core engine;
a mixing section where exhaust from the core engine is mixed with air from the bypass duct and
a thrust reverser downstream of the mixing section, wherein the thrust reverser comprises
an upper reverser door pivotally mounted to a frame on an upper side of a central axis extending through the pre-exit thrust reverser and having an upper trailing edge;

a lower reverser door pivotally mounted to the frame on a lower side of the central axis and having a lower trailing edge; and an exhaust duct fixedly mounted to the frame, wherein the upper trailing edge is configured to extend aft of the lower trailing edge when the thrust reverser assumes a deployed state and wherein the upper reverser door has an upper door length and the lower reverser door has a lower door length, the upper door length being greater than the lower door length.

18. The gas turbine engine of claim 17, further comprising an upper pivot assembly pivotally connecting the upper reverser door to the frame and a lower pivot assembly pivotally connecting the lower reverser door to the frame and wherein the upper pivot assembly has a center of rotation positioned aft of a center of rotation of the lower pivot assembly.

\* \* \* \* \*